D. L. ADELSPERGER.
ALFALFA CUTTING MACHINE.
APPLICATION FILED MAR. 21, 1908.
932,745.
Patented Aug. 31, 1909.
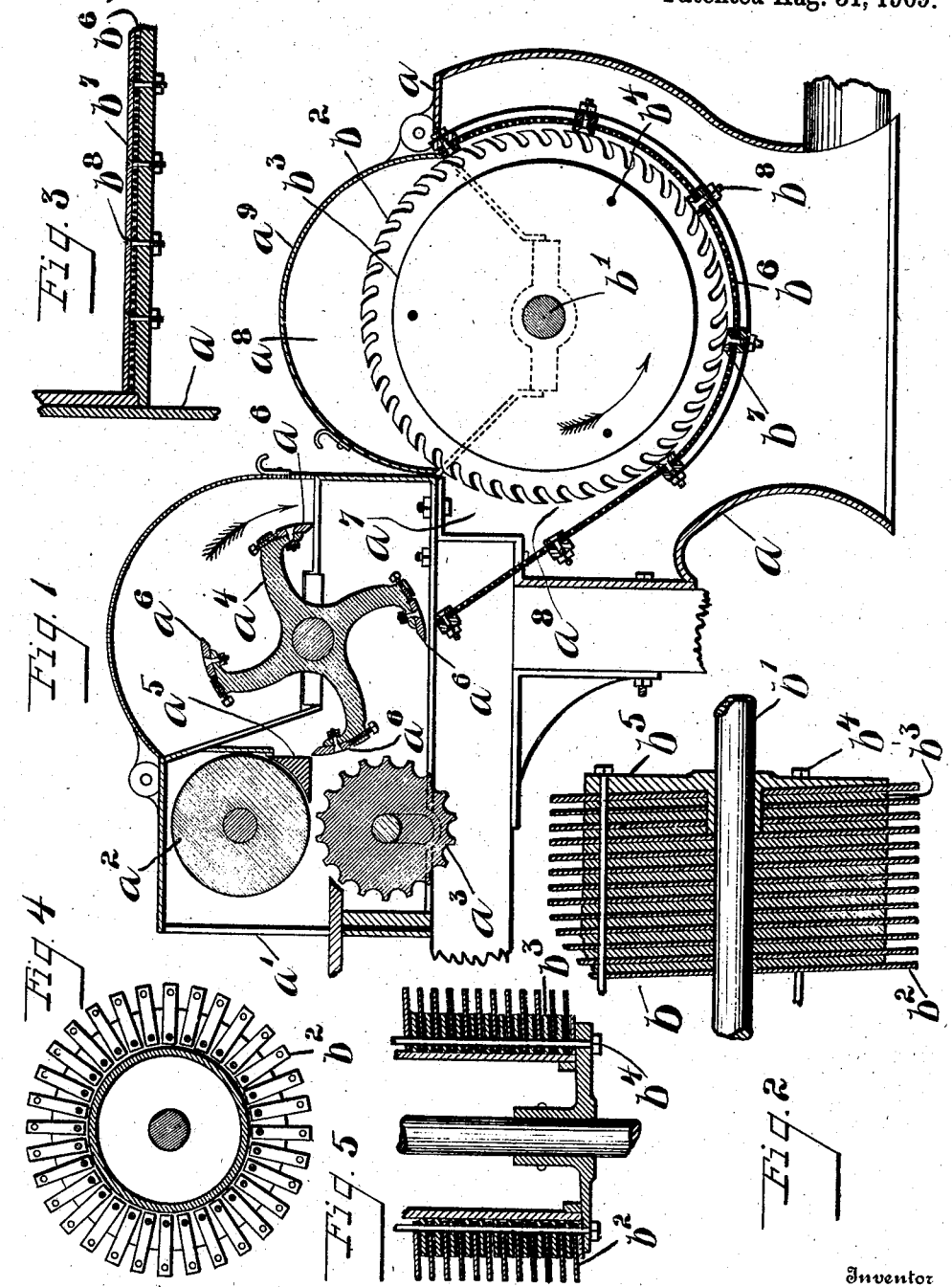

UNITED STATES PATENT OFFICE.

DOW L. ADELSPERGER, OF SPRINGFIELD, OHIO, ASSIGNOR TO THE FOOS MANUFACTURING COMPANY, OF SPRINGFIELD, OHIO, A CORPORATION OF OHIO.

ALFALFA-CUTTING MACHINE.

932,745.　　　Specification of Letters Patent.　　Patented Aug. 31, 1909.

Application filed March 21, 1908. Serial No. 422,400.

*To all whom it may concern:*

Be it known that I, Dow L. ADELSPERGER, a citizen of the United States, residing at Springfield, in the county of Clark and State of Ohio, have invented certain new and useful Improvements in Alfalfa-Cutting Machines, of which the following is a specification.

My improvement relates to machines for cutting alfalfa hay and similar articles.

My object is to construct the parts so that the hay will be cut to proper lengths and thereafter chopped or comminuted as finely as possible and to this end I have found it desirable to so arrange the mechanism that no stems or pieces of any length can interfere with the chopping operation. It is desirable to employ appliances for chopping this hay after it is partially cut so arranged that pieces of the stalks of the hay cannot get between the blades of the chopping appliance. By reason of the fact that the screen is employed through which the comminuted particles of hay must pass it is especially desirable that the particles be chopped up evenly so that the screening operation will not be interfered with.

In the drawings Figure 1 is a transverse sectional view through the center of the machine. Fig. 2 is a detail view of the chopping mechanism. Fig. 3 is a detail view in section showing the screen and casing. Figs. 4 and 5 are detail views of a modification of the chopping mechanism.

Like letters of reference indicate like parts throughout the several views.

The main casing for the machine is indicated by the letter $a$ and is comprised of ordinary stationary upright parts. $a^1$ indicates an upper frame for the feed rollers and cutter and this frame is bolted in any ordinary way to the stationary frame $a$. The feed rolls $a^2$ and $a^3$ are journaled in the upper frame $a^1$ and are operated continuously in the ordinary way for feeding the hay to the cutter $a^4$. The lower feed roller is preferably shown of the fluted feed type. I have shown a stationary cutting bar $a^5$ between the two feed rolls which is secured in the ordinary way within the upper frame $a^1$. The cutter $a^4$ is also journaled within the upper frame and is revolved continuously by manual operating means or power driven devices so that it will rotate in the direction of the arrow. I have shown this cutter device preferably of the ordinary spiral type having a series of projecting arms which carry the cutting blades $a^6$. During the revolution of said cutter the hay is cut in short lengths by coöperation of the movable blades $a^6$ and the stationary cutting bar $a^5$, there being shown in Fig. 1 one of said blades $a^6$ in a position to coöperate with the stationary bar $a^5$ to cut the hay. The hay after being cut is carried by said cutter or impelled thereby to the opening in the bottom of the stationary casing $a^1$ at the point indicated by $a^7$ and said hay then drops within the receptacle $a^8$ which is formed in the stationary frame $a$ and there is the usual form of hinged top $a^9$ encircling said casing.

The chopping device $b$ comprises a series of disk like blades securely fastened together on the shaft $b^1$ and said chopping device is preferably connected by any ordinary connection with the operating device so that it will rotate continuously and I have shown same adapted to rotate in a direction reverse to that of the cutter $a^4$. The circular blades are indicated by $b^2$ (see Fig. 2) and between each pair of blades there is a washer $b^3$, and a bolt $b^4$ securely fastens the washer and blades to the body portion $b^5$, the chopper and these blades are preferably circular and are formed with cutting teeth somewhat in the nature of saw teeth on the periphery of the blades thereof.

In Figs. 4 and 5 I have shown a modification of this chopper device whereby I dispense with the circular disk-like blades and instead thereof use flexible hinged blades secured to the body portion of the chopper somewhat in the same manner as shown in Fig. 2.

The screen $b^6$ is placed on the bottom of the receptacle $a^8$ and same is secured to the bottom of the receptacle by means of bars $b^7$ which project above the bottom of the receptacle and coöperate with the teeth on the blades $b^2$ for the purpose of cutting the hay into small particles. I have shown these cutter bars $b^7$ attached to the casing $a$ by bolts (see Fig. 3) $b^8$ counter-sunk therein. As shown in Fig. 1 these cutter bars $b^7$ are spaced at intervals so that there are shown in fact five cutter bars which coöperate with the teeth formed on the disk $b^2$ for the purpose of comminuting the hay into small particles.

It is apparent that the chopping device is so arranged that the hay will be carried or impelled around the receptacle until it is reduced to particles sufficient to pass through the screen $b^6$.

I have shown the chopping device so arranged that the blades $b^2$ have a wabble movement, which is accomplished by placing the blades $b^2$ at an inclination out of the true vertical plane of rotation so that during the rotating movement of the disk their planes move from side to side. This is especially desirable in this class of machinery because the wabbling motion of the disk will prevent the stems or straws of hay getting within the spaces between the cutting blades and thereby interfering with the operation of the machine.

Having described my invention, I claim as follows:—

1. In a machine of the character mentioned, the combination of a cutting device comprising a stationary cutter and a revoluble cutter having a plurality of cutting bars, with a chopping device comprising a plurality of rotating blades located in proximity to said cutting device, a screening device, and a plurality of stationary bars projecting above said screening device and coöperating with said chopping device, substantially as specified.

2. In a machine of the character mentioned, the combination of a cutting device with a chopping device located in proximity to said cutting device, a receptacle partially inclosing said chopping device, a screening device located at the bottom of said receptacle, a plurality of stationary blades spaced at intervals and projecting above said screening device, substantially as specified.

In testimony whereof, I have hereunto set my hand this 17th day of March, 1908.

DOW L. ADELSPERGER.

Witnesses:
CHAS. I. WELCH,
MARJORIE S. MORROW.